July 3, 1923.
B. L. BRADDICK
COMBINED FIELD OVEN AND COOKING UTENSIL
Filed July 15, 1922
1,460,639
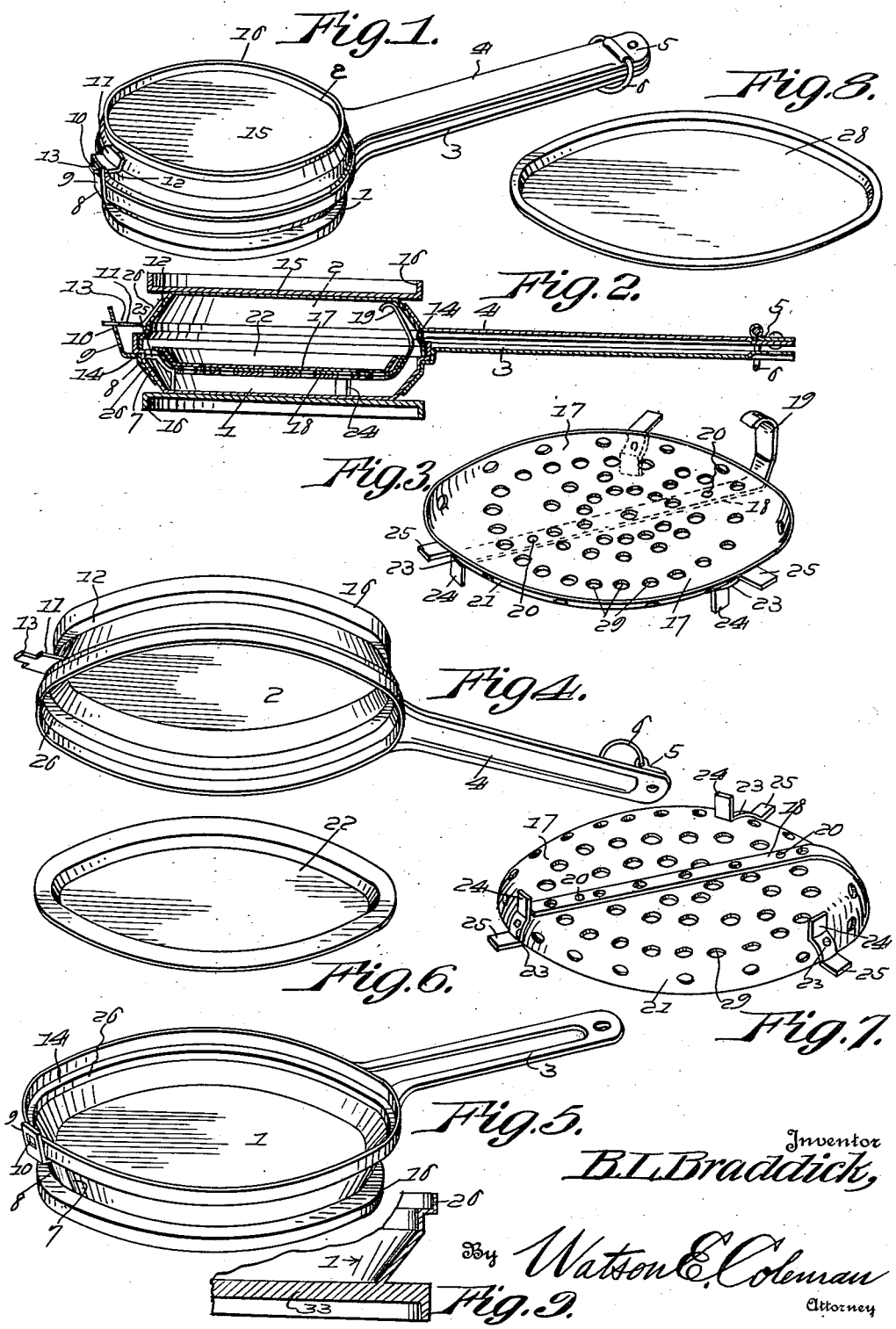
Inventor
B. L. Braddick,
By Watson E. Coleman
Attorney Patented July 3, 1923.

1,460,639

UNITED STATES PATENT OFFICE.

BERNARD L. BRADDICK, ( WASHINGTON, DISTRICT OF COLUMBIA.

COMBINED FIELD OVEN AND COOKING UTENSIL.

Application filed July 15, 1922. Serial No. 575,316.

*To all whom it may concern:*

Be it known that I, BERNARD L. BRADDICK, a citizen of the United States, residing at Washington city, District of Columbia, have invented certain new and useful Improvements in Combined Field Ovens and Cooking Utensils, of which the following is a specification, reference being had to the accompanying drawings.

It is the purpose of the present invention to provide an article of manufacture of this character particularly adapted for performing five of the major operations in cooking; namely, roasting or baking, steaming, broiling and frying.

In order to accomplish these different major operations in the art of cooking, it is the aim to provide a combined field oven and cooking utensil comprising opposed invertible pans including handles, one to be used in an inverted position upon the other, in combination with a steamer attachment on the interior, for the purpose of broiling boiling, steaming or poaching various articles of food.

Furthermore by use of the steamer, it is possible to roast and bake equally as well as broiling and boiling.

A further purpose is to provide a combined field oven and cooking utensil, wherein the bottom of each pan is thickened, or has fastened thereto upon the under surface an extra plate, for the purpose of retaining the heat, so that when one pan is inverted and placed upon the other, the heat therefrom will descend, and act to cook the articles upon the top. For instance by placing the steamer which is perforated, within one pan, and inverting and placing the other pan over the first one, with a pie in the usual pie pan placed upon the steamer, the pie may be baked, due to the heat from the inverted pan descending and acting to cook the top crust of the pie. Obviously by placing a roast on the perforated steamer, it is possible to roast. It is also possible to broil a steak on the perforated steamer, and by removing the steamer entirely, each pan may be used for frying purposes. However, by using the steamer, and filling one pan with water to come to a boil, an egg may be poached on the perforated steamer.

Still another purpose is the provision of a steamer, which is perforated, including guide arms and legs, to guide and support the perforated steamer in position in either one of the pans.

A further purpose is the provision of a steamer, wherein each leg and its adjacent guide arm are constructed from a single piece of metal, bent to form the leg and the guide arm, the leg to engage the bottom of the pan, whereas the arm engages the side of the pan.

A still further purpose is the provision of a reinforcing bar which extends across the bottom of the steamer and terminates in a handle at one side, whereby the steamer may be inserted and removed at any time.

It is true that in the patent issued to B. L. Braddick, December 9, 1919, Patent No. 1,324,294, there is disclosed an article similar to the present device, with the exception of the steamer, and also that the bottom of each pan is the same thickness as the sides of the pans, therefore the bottoms do not act to retain the heat, for the purpose of baking and roasting. In the patent just mentioned, the flange 3 provides means to prevent the flames from licking the sides of the pan, and thereby burning the articles of food which are cooked therein. However in the present case the bottom of each pan may be thickened, as shown in Figure 9, or provided with an additional thick metal plate as shown in Figure 2, for the purpose of retaining the heat on the interior of the combined field oven and cooking utensil, for causing the heat to descend and cook the articles upon the top while they are cooking upon the bottom. It is preferable, however, to provide the bottom of each pan with an additional thick metal plate instead of thickening the bottom of the pan itself.

The invention further aims to provide means permanently carried by one of the handles of the pan, for connecting the two handles, to hold the pans in position.

It is to be understood that the particulars herein given are in no way limitative and that while still keeping within the scope of the invention, any desired modifications of detail and desired proportions may be made in the apparatus according to circumstances.

The invention comprises further features and combination of parts, as will be hereinafter set forth, shown in the drawings and claimed.

In the drawings:—

Figure 1 is a view in perspective of the improved combined field oven and cooking utensil constructed in accordance with the invention;

Figure 2 is a sectional view on line 2—2 of Figure 1;

Figure 3 is an enlarged detail perspective view of the steamer;

Figure 4 is an enlarged detail perspective view of one of the pans, showing the pan raised above the level of the eye;

Figure 5 is a detail perspective view of the other pan;

Figure 6 is a detail perspective view of the pie pan 22;

Figure 7 is an enlarged detail view in perspective of the under face of the steamer;

Figure 8 is a detail perspective view of the pan 28;

Figure 9 is a detail sectional view of a portion of one of the pans, showing a modified construction wherein the bottom is considerably thickened and in one piece, instead of having the two thicknesses of metal.

Referring to the drawings, 1 and 2 designate the two pans of the combined field oven and cooking utensil. The pans are substantially identical in construction and proportion, with the exception that one near the margin of the flange thereof is provided with an annular shoulder to be engaged by the margin of the flange of the pan 2, which is inverted and placed in engagement with the pan 1, as shown in Figures 1 and 2. By this construction the bottoms of the two pans are held spaced.

The pans 1 and 2 are provided with handles 3 and 4, the latter of which has pivoted thereto near its extremity by means of a folded plate 5 a loop 6, which swings under and in engagement with the handle 3, thereby latching the two handles together, and holding the two pans in position. Secured in any suitable manner as at 7 to the flange of the pan 1, preferably by brazing, though not necessarily, for it is obvious that riveting may be employed, is a plate 8, which has an extended portion 9, which is bent upwardly, and is provided with a slot or opening 10. A plate 11 is secured by brazing or riveting as at 12 to the flange of the pan 2, and the lateral end 13 of the plate enters the slot or opening 10. When placing the pan 2 in an inverted position upon the pan 1, the projecting lateral end 13 enters the opening or slot 10 of the extension 9. The flange of the pan 2 then rests upon the shoulder 14 of the pan 1 with the two handles 3 and 4 in parallelism, after which the loop 6 is swung under and in engagement with the handle 3, thereby locking the two pans together.

Secured by brazing or spot welding or otherwise to the bottoms of the pans 1 and 2 are circular plates 15. These plates 15 are of greater diameter than the diameters of the bottoms of the pans, therefore they project beyond the margins of the bottoms of the pans, and have lateral flanges 16, which act to prevent the flame from the fire from licking the sides of the pan. Also the plates 15 act to retain the heat on the interior of the combined field oven and cooking utensil. For instance in baking pies, roasting beef, the pans together with the extra plates 15 are thoroughly heated, and due to the extra thicknesses of the plates 15, the interior of the field oven and cooking utensil is thoroughly supplied with heat from the extra plates. The heat from the extra plate on the inverted pan descends and acts to cook the top of the meat or pies or other articles of food, while the heat at the bottom of the lower pan thoroughly cooks the bottom of the pie, meat or other food.

While the patent to B. L. Braddick issued December 9, 1919, Patent No. 1,324,297 discloses the marginal extensions on the bottoms of the pans, together with the annular flanges so as to prevent the flames from licking the sides of the pan, it does not disclose the extra plates, or extra thicknesses on the bottoms of the pans, for the purpose of retaining the heat. Due to the extra plates 15, or otherwise providing extra thicknesses on the bottoms of the pans 1 and 2, the present invention is an essential improvement over the construction shown in the above mentioned patent.

Each pan may be used for frying, but in order to broil, or boil, the present invention aims to include what is known as a steamer, for the purpose of supporting the article to be broiled, boiled or poached above the surface of the pan in which it is supported. This steamer comprises a perforated plate 17, which is relatively thin, and secured across the bottom of this plate is a bar 18, which may be constructed of any suitable metal, preferably iron. This bar is also perforated, and has one end extended upwardly to provide a handle 19. The bar may be secured to the plate in any suitable manner, preferably by brazing, spot welding, or riveting as at 20. The steamer plate 17 is dished, or the marginal portion thereof is curved upwardly, as shown at 21, so as to retain certain articles of food, such as eggs, vegetables and the like from running over the margin of the plate. In poaching eggs, the pan 1 may be filled with a sufficient amount of water, which may be brought to a boil, with the steamer plate engaged with the pan 1, after which an egg may be deposited upon the perforated steamer plate, which will support the egg and prevent it from being cooked hard upon the bottom. The boiling water will act to poach the egg, and after which by means of the handle, the perforated steam plate may be removed, with the poached egg therein. In cooking eggs in this manner, the pan 2 may be placed in an inverted position upon the pan 1, if so desired, though not necessarily. Either pan may support the steamer plate. For example the pan 2 is of a diameter to permit the steamer plate to be placed therein, equally as well as in the pan 1.

It is obvious that the pans may be made any depth, for instance sufficient to permit a piece of meat to be arranged between the two pans, preferably being supported upon the steamer plate, thereby preventing the meat from sticking to the bottom of the pan, and since the meat is arranged between the two pans, the steam from the meat as it becomes roasted or baked ascends and becomes condensed, and drips back upon the meat, acting to baste the same, as it is in the process of cooking. Meat cooked in this manner is very moist, due to this manner of automatically basting the meat, and very palatable. The heat which is retained on the interior of the field oven and cooking utensil by means of the extra plates 15 acts to thoroughly cook the meat on the top and bottom thereof, and due to the present manner of basting, the meat thoroughly browns.

The steamer plate is also used for baking pies and the like. For instance the pie to be baked is made up in the usual pie pan 22 as shown in Figure 6, and in section in Figure 2 resting upon the steamer plate, and is first placed in position, and the pan 2 arranged in an inverted position upon the pan 1. The handles of the two pans are then latched together as shown, and the combined field oven and cooking utensil is then placed on the fire. The steamer plate acts to prevent the intense heat which may be below the pan 1 from coming in direct contact with the pie pan, and hence preventing the pie from burning on the bottom. The additional plate or extra thickness on the bottom of the pan 2 acts to retain the heat on the interior of the field oven, and causes it to descend, and thoroughly cook the top of the pie.

Articles to be boiled may be placed upon the perforated steamer plate, with water surrounding the same, the steamer plate acting to hold the articles to be boiled from the bottom of the pan 1, and thereby prevent burning of the food.

Obviously in a broiling operation, the meat may be placed directly upon the perforated steamer plate, and the pan 1 placed in an inverted position upon the pan 2. The heat on the interior of the combined field oven and cooking utensil will act to broil the meat, and brown it upon both sides. In order to thoroughly broil the meat, the pan 2 may be disengaged from the pan 1, and the meat lifted from the steamer plate, and inverted, then the pan 2 may be replaced in position, and the field oven replaced upon the fire.

The under face of the perforated steamer plate adjacent its upwardly curved margin has riveted thereto plates 23. Obviously the plates 23 may be brazed or spot welded to the steamer plate. Each plate 23 has one end extended downwardly to constitute a leg 24, while its other end 25 is extended to provide an arm. These arms 25 engage the cylindrical portion 26 of the flange of each pan 1 and 2, it depending entirely upon which pan the steamer plate is resting. However the steamer plate is supported upon the pan 1 in Figure 2, and in this case the arms 25 are engaged with the cylindrical portion of the flange of the pan 1. The legs 24 extend downwardly, and engage the bottom of the pan, thereby supporting the steamer plate in a spaced position above the bottom of the pan. The arms 25 act to guide and center the steamer plate when in the act of placing it in engagement with either of the pans. As shown in Figure 8 an additional pan 28 is provided. This pan 28 may be supported upon either one of the annular shoulders 14, it depending entirely upon which pan is arranged upon the fire or at the bottom.

The extra plate 15, or the considerable thickened bottom 33 of the pan shown in Figure 9 of the drawing may be made of copper or any other material, such as will hold or retain the heat, in order to concentrate considerable heat on the interior of the combined field oven and cooking utensil.

It will be noted that the steamer plate has its upwardly curved marginal portion spaced a substantial distance from the flange of the pan 1 on which the steamer plate is supported, so that the heat from the bottom of the pan 1 may pass upwardly around the margin of the steamer plate, and act to cook the articles of food upon the plate. By spacing the margin of the steamer plate from the flange of the pan, the article of food is prevented from burning. The rising heat which passes between the margin of the steamer plate and the flange of the pan is deflected by the pan above and descends upon and acts to cook the articles of food on the steamer plate.

It is to be understood that this combined field oven and cooking utensil may be used anywhere, either indoors or outdoors, preferably in camps, and on wood or coal stoves or on electric heaters and the like. Also on oil burners or upon open grates, or upon camp fires. This device is particularly adapted for use by automobile tourists, in view of the fact that it will enable meals to be very easily and quickly prepared.

The invention having been set forth, what is claimed is:—

1. In a combined field oven and cooking utensil, the combination with a pair of complemental pan sections, one being inverted over and engaging the other, means for latching said pan sections together, each pan section having its marginal flange provided with a cylindrical portion, a perforated steamer plate, bracket plates secured to the under face of the steamer plate and having lateral arms to engage the cylindrical portion of one of the pan sections, and provided with downwardly extending legs to engage the bottom of one of the pan sections, to support the steamer plate.

2. In a combined field oven and cooking utensil, the combination with a pair of complemental pan sections, one being inverted over and engaging the other, means for latching said pan sections together, each pan section having its marginal flange provided with a cylindrical portion, a perforated steamer plate, bracket plates secured to the under face of the steamer plate and having lateral arms to engage the cylindrical portion of one of the pan sections, and provided with downwardly extending legs to engage the bottom of one of the pan sections, to support the steamer plate, a bar secured to the under face of the steamer plate to reinforce the same and terminating at one end in a handle, whereby the steamer plate may be lifted from the pan section, when the top pan section is removed.

In testimony whereof I hereunto affix my signature.

BERNARD L. BRADDICK.